Jan. 26, 1965   J. J. KELLY ETAL   3,167,092
QUICK DISCONNECT COUPLING
Filed Oct. 20, 1960   2 Sheets-Sheet 1
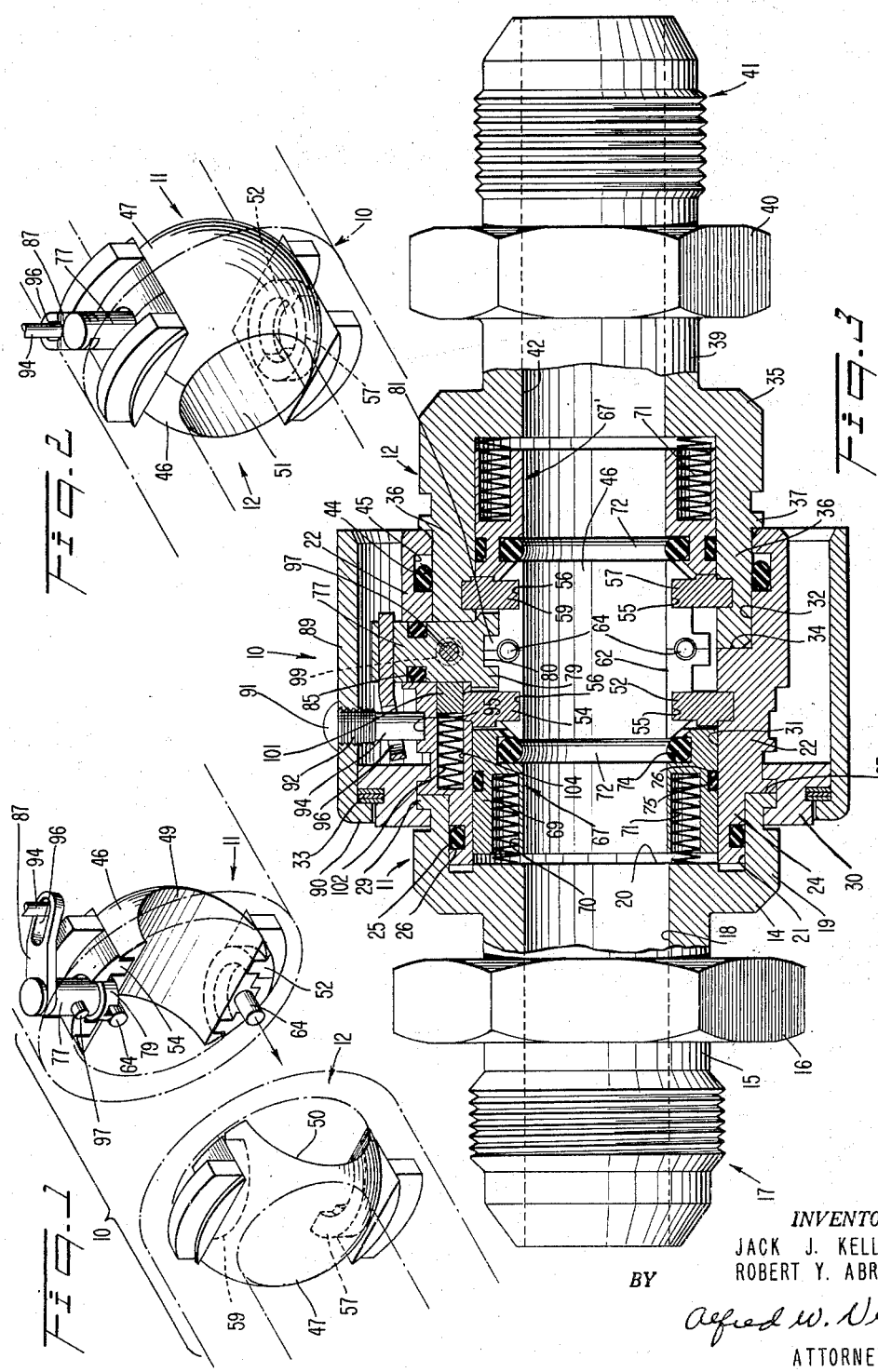
INVENTORS
JACK J. KELLY
ROBERT Y. ABRAMSON
BY
Alfred W. Vibber
ATTORNEY

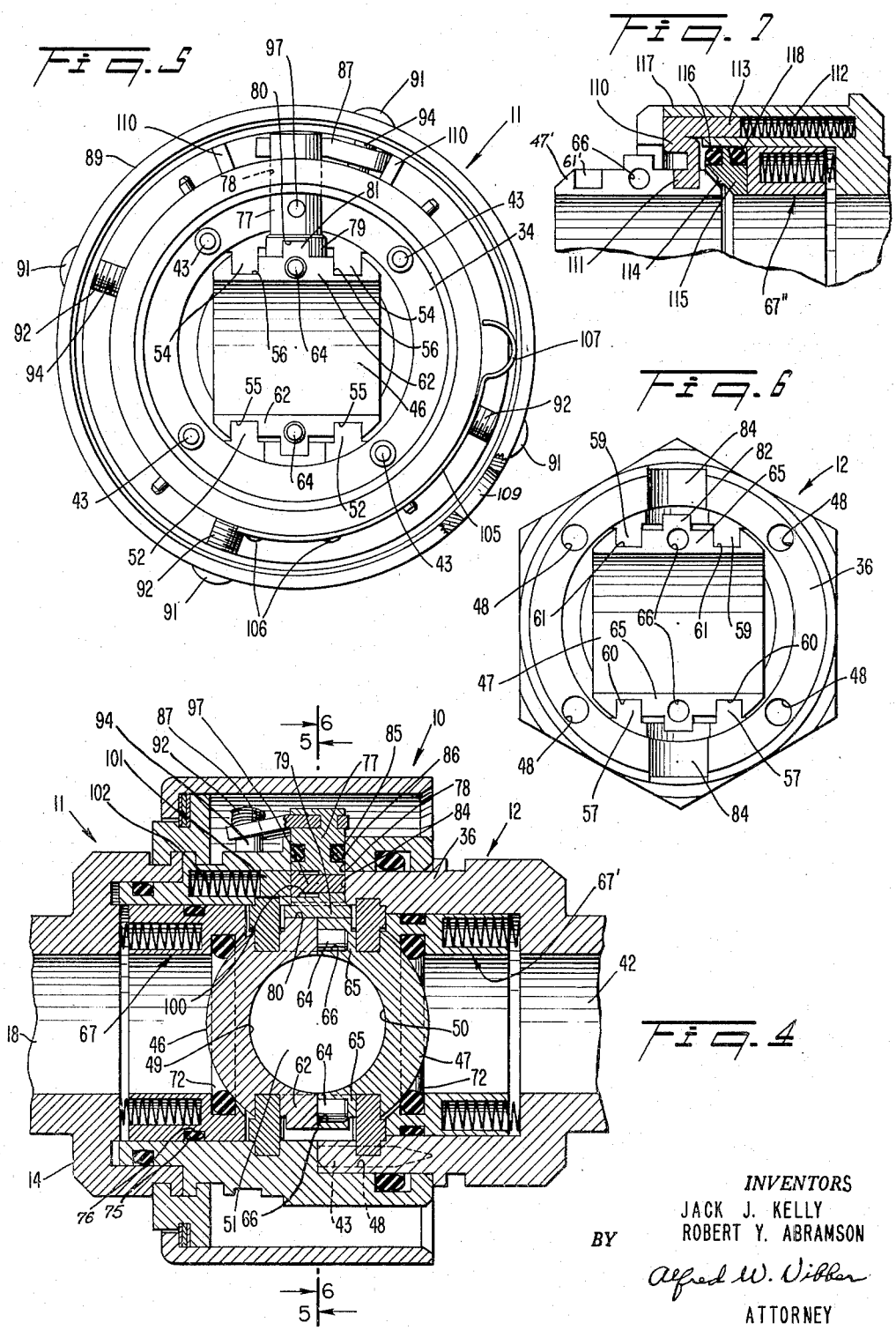

United States Patent Office 3,167,092
Patented Jan. 26, 1965

3,167,092
QUICK DISCONNECT COUPLING
Jack J. Kelly, Waldwick, and Robert Y. Abramson, Paterson, N.J., assignors to Tech-Quip, Midland Park, N.J., a corporation of New Jersey
Filed Oct. 20, 1960, Ser. No. 63,749
13 Claims. (Cl. 137—614.01)

This invention relates to self-sealing couplings adapted for quick and easy operation while automatically sealing the coupling parts when the same are detached from each other. More particularly, the invention relates to a device for coupling together the ends of tubes, pipes and the like to provide unrestricted communication between them when they are coupled together, the device sealing the ends of the tubes and pipes when the coupling parts are uncoupled.

In many instances it is desirable or necessary to disconnect the parts of a fluid pressure circuit. It is advantageous that the means for coupling the parts of the circuit together itself also provides for the sealing of the ends of the tubes or pipes to which the coupling parts are connected when the coupling parts are detached or uncoupled. It is desirable not to introduce restriction of the flow of fluid in the circuit by reason of the quick disconnect coupling, or to add unduly to the weight and bulk of the system. Restrictions on the permissible space requirement and weight are particularly rigid when the coupling is employed in an airplane.

It is among the objects of the present invention to provide a novel quick disconnect coupling which is particularly characterized by its being small in size and light in weight.

Yet another object of the invention lies in the provision of a quick disconnect coupling which is particularly reliable in operation, may be positively locked in either its coupled or uncoupled condition, and in which there is provided a sight and feel indicator which gives assurance that the coupling is completely connected and locked.

Still a further object of the invention lies in the provision of a quick disconnect coupling which incorporates a full swivel in at least one of the coupling parts thereby allowing the parts readily to be connected, and in which the coupling parts are connected or disconnected by a simple turning of a sleeve in reverse directions about the axis of the coupling.

Another object of the invention lies in the provision of a quick disconnect coupling of such construction that there is no appreciable pressure loss therethorugh when the coupling is in operative condition, and which incorporates only a small number of seals, thereby rendering maintenance of the coupling simple and economical.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a schematic view in perspective of an illustrative embodiment of coupling in accordance with the invention, the coupling parts being shown in confronting but uncoupled condition;

FIG. 2 is a view similar to FIG. 1 but with the inner valve parts of the coupling being shown connected in mating relationship and turned 90° from the position of FIG. 1 so as to permit the flow of fluid through the coupling;

FIG. 3 is a view in vertical axial section through the coupling with the parts thereof connected to form a continuous fluid conducting passage therethrough, certain of the parts being shown in elevation;

FIG. 4 is a view in vertical axial section through the central, valve part-containing portion of the coupling of FIG. 3, the valve-forming parts of the coupling being shown after having been turned 90° about their vertical axis preparatory to separation of the coupling parts;

FIG. 5 is a view in vertical transverse section through the coupyling with the valve-forming parts in passage-closing position, the figure being taken generally along the line 5—5 of FIG. 4, certain of the parts being shown in elevation;

FIG. 6 is a view in vertical transverse section through the coupling, the section being taken along the line 6—6 of FIG. 4, certain of the parts being shown in elevation; and FIG. 7 is a fragmentary view in vertical transverse section through an alternative embodiment of the part or end of the coupling corresponding to part 11 in the first described embodiment.

The illustrative embodiment of quick disconnect coupling of the invention is designated as a whole by the reference character 10. Such coupling has two main parts or ends 11 and 12 which are adapted to be connected in fluid tight relationship to the ends of tubes, conduits or the like to be connected by the coupling. The portion 11 of the coupling, shown at the left in FIGS. 1–4, inclusive, incorporates therein a full swivel device whereby the portion of such coupling part which mates with the other coupling part may be freely turned about the axis of the coupling to allow the ready joining of the parts. Coupling part 11 also incorporates driving means whereby the two coupling parts, when placed in confronting engaging relationship, may be locked together and the valve-forming parts thereof may be turned to open the passage through the coupling. Such driving means, when turned in the reverse direction, permits the passage through the valve-forming parts to be closed and the coupling parts to be disconnected.

Coupling part 11 has a hollow body which is formed of suitable material such as metal. Such body, which is generally in the form of a body of revolution, has a transversely flanged portion 14 which has centrally connected thereto a tubular extension 15 which extends to the left. Extension 15 includes an enlarged wrench-receiving portion 16, and at the end thereof carries means 17 including a conical seat and threads whereby the extension may be connected to a suitable fitting at the end of a pipe or tube. A longitudinal fluid-conducting bore 18 extends through part 15 into the interior of the coupling 10. An axially short forwardly extending tubular flange 19 is integrally connected to flange 14.

Flange 19, which serves as one element of the above referred to swivel connection, has a bore 21 therein which accurately but rotatably receives the rearwardly extending central hollow boss 24 of a sleeve 22. Boss 24 is sealed to flange 19 by an O-ring 25 made of a suitable elastomeric material, O-ring 25 being received in an annular groove 26 in the outer peripheral surface of boss 24. Sleeve 22, which is coaxial of flange 19, extends to the right from such flange. Sleeve 22 is accurately located with respect to the flange 19 by engagement between the two at a peripherally extending interface 27 which extends transverse to the longitudinal axis of the coupling. Sleeve 22 is retained in the position shown in FIG. 3 by a diametrically split ring clamp 30 which has an inner peripherally extending groove which accurately but rotatably receives within it a composite outwardly directed flange 29 formed in part by a flange portion on member 19 and in part by a flange portion on sleeve 22. The halves of the split ring 30 are retained clampingly in place by a conventional spring locking ring 33 which is received within an annular outer peripheral groove in split ring 30. It will be seen that, as a result of the described construction, the sleeve 22 is free to rotate with respect to body 14.

Sleeve 22 has a first, smaller bore 31 therein in its rear end portion and a second larger bore 32 therein in its forward end. The bores 31 and 32, which are coaxial with the longitudinal axis of the coupling, are joined at a transverse peripherally extending shoulder 34. Coupling part 12 has a hollow main body portion 35 with a sleeve-like annular end portion 36 of such diameter as snugly and accurately to telescope within the bore 32 of sleeve 22. Sleeve-like portion 36 has an annular flange 37 thereon of such length as to engage the outer end of sleeve 22 when the inner end of element 36 abuts shoulder 34. Body 35 has a tubular extension 39 thereon similar to extension 15, a wrench-receiving portion 40, and a terminal connection 41 whereby it may be connected to a suitable fitting. The body 35 and the extension 39 thereon have a central passage 42 therethrough which is of the same size as and coaxial with passage 18 in coupling part 11. Such passages, together with the further passage through the valve-forming parts of the coupling, to be described, provides for the flow of fluid without any substantial disturbance or restriction in flow area through the coupling.

A plurality of axially directed locking or pilot pins 43 (four shown) mounted on sleeve 22 are angularly spaced about the shoulder 34. Such pins, which extend to the right as shown in FIG. 4, are snugly and accurately received within holes 48 which are located in the leading edge of sleeve-like member 36. An O-ring 44 received in a peripheral groove 45 in the inner face of sleeve 22 provides for the effective sealing of parts 22 and 36 together. There is thus formed a tubular housing which is interposed between and forms prolongations of tubes or conduits which are joined by the coupling. Within such housing there is disposed a composite valve element which may be turned to either valve-open or valve-closed position, the parts of the valves themselves forming closures for the passages in the respective housing parts when the coupling parts are made ready for disconnection. In the embodiment of coupling shown, the valve-forming parts themselves cooperate with means in the housing parts whereby to lock the latter together when the valve is in fluid-passing position. As shown most clearly in FIGS. 1, 2, and 4, the valve-forming parts are in the form of mating half balls 46 and 47, part 46 being designated the driving half and part 47 being designated the driven half. Half balls 46 and 47 have semi-cylindrical passage portions 49 and 50 therein, respectively, such passage portions cooperating to form a full cylindrical passage 51 when the ball halves 46 and 47 are in mating relationship.

The ball half 46 has a lower crescent-shaped groove 55 and an upper crescent-shaped groove 56 therein, such grooves being of rectangular cross section, having the same inner and outer radii, and lying in parallel planes. The ball half 47 has a similar lower crescent-shaped groove 60 therein and an upper crescent-shaped groove 61. In the sleeve portion 22 of coupling part 11 there are disposed upper and lower crescent-shaped guides 54 and 52, respectively. the guides being affixed to sleeve 22 by having their radially outer edges received in grooves in the sleeve, as shown. The crescent-shaped guides 52 and 54 are disposed in alignment, and extend radially inwardly of, sleeve 22. Coupling part 12 is provided with similar upper and lower crescent-shaped guide elements 59 and 57 which are affixed to the sleeve-like portion 36 of body 35. The lower guide elements 52, 57 and the upper guide elements 54, 59 are so disposed that when the coupling parts are in mating engagement as shown in FIGS. 2 and 3, the crescent-shaped guides form complete coaxial circular guide elements.

When the valve elements 46 and 47 lie in transverse, passage-closing position, as shown in FIG. 1, the upper and lower crescent-shaped guides of the respective coupling parts lie completely within the upper and lower crescent-shaped grooves in the respective ball parts 46 and 47. Thus the ball halves, when in such position, may be freely presented to each other and removed from each other. When, however, after the ball halves have been placed in mating engagement they are turned 90° about the axis of the crescent-shaped guides and grooves, one half of each of the guides is received in a groove in one half of the opposing crescent-shaped guide as received in the groove, as shown in FIG. 2.

The upper and lower edges of the half balls are thickened as shown at 62 on ball half 46 and at 65 on ball half 47. Projecting in an axial direction from the thickened edges 62 of ball half 46 are two parallel pilot pins 64 which are accurately received within bores 66 (FIG. 4) in the thickened edge 65 of ball half 47.

Each of coupling parts 11 and 12 has an annular sealing means which resiliently engages the rear or outer surface of the ball halves thus to maintain a fluid-tight passage through the coupling. Such sealing means in coupling part 11 is designated 67; the similar sealing means in coupling part 12 is designated 67'. Seal 67 includes a sleeve-like body 69 which is accurately but slidably disposed within bore 31 of sleeve 22. The forward inner peripheral edge of body 69 is provided with an annular seat 74 which receives an O-ring 72 therewithin. Body 69 is constantly thrust to the right (FIG. 3) so that O-ring 72 sealingly engages the rear surface of the valve element, by a plurality of coil compression springs 71 which are disposed in axially directed, angularly spaced bores 70 in body 69. The rear ends of springs 71 abut the inner transverse surface 20 of the main body of coupling part 11. O-ring 72 may be made of any suitable sealing material. In many applications it is advantageous to make ring 72 of tetrafluoroethylene (Teflon), because of its resistance to attack and its low coefficient of friction. When such or similar material is employed for rings 72, the torque required to turn the valve-forming elements from open to closed position or vice versa is at a minimum. The body 69 of sealing means 67 is maintained sealed to the bore 31, while being free to move axially with respect thereto, by an O-ring 75 which is received within an annular seat 76 in body 69.

In some instances it may be desired to simplify the structure of the above-described sealing means 67 and 67'. In such modification the springs 71 and the spring-receiving bores 70 are omitted, body 69 being resiliently pressed toward the ball halves 46 and 47 by annular sinusoidally bent spring washers interposed between the annular end wall of the housing and the respective sleeve-like body of the sealing means.

The two ball halves 46 and 47 when presented in mating relationship are engaged by a common driving stem or shaft 77 whereby they are turned from the position of FIG. 1 to that of FIG. 2 or in the reverse direction. Shaft 77 is journalled in a bore 78 in sleeve 22, as shown in FIGS. 3, 4, and 5. The lower end of shaft 77 is enlarged at 79, enlargement 79 having a transversely extending downwardly open groove 80 therein. Groove 80 is of such section as snugly and accurately to receive the composite projection or ear formed by the mating vertically extending projections 81 and 82 on the upper edges 62 and 65 of ball halves 46 and 47. Thus when the coupling part 11 is in the uncoupled position of FIG. 5, the groove 81 has a forward unfilled portion ready to receive the projection 82 on ball half 47. A portion of shaft 77, radially inward of sleeve 22, is exposed when coupling part 11 is disconnected. Sleeve-like element 36 of coupling part 12 has a part-cylindrical recess 84 therein disposed to receive such radially inward portion of the shaft when the coupling parts are mated as shown in FIG. 3. Shaft 77 is provided with a seal in the form of an O-ring 85 which is disposed in a peripherally-extending groove 86 about the shaft.

Shaft 77 is turned from the position shown in FIG. 1 to that in FIG. 2 or vice versa by an arm 87 which is connected to the outer end of the shaft. Such arm is operated by a sleeve-like shell or cover 89 which is disposed coaxial of housing part 11. Shell 89 has a rear inwardly extending flange 90 which partially overlies the rear end of split clamp 30. The shell is retained in the axial position shown by a plurality (four shown) of radially inwardly extending studs 91 which are connected to the shell by threaded joints 92. The inner portions 94 of the studs are smooth. The inner ends of the studs are accurately but slidingly received within a peripherally extending groove 95 in sleeve 22. The shell 89 is thus retained from axial movement with respect to the other elements of coupling part 11, but may rotate with respect thereto.

The limited rotation of shell 89 is employed to turn the arm 87. Arm 87 has an elongated slot 96 in the outer end thereof. The inner smooth end 94 of one of studs 91 extends through slot 96. When the shell 89 is turned in one direction, it rotates stem 77 counterclockwise in FIG. 1 to bring the parts 46 and 47 into the position of FIG. 2. Turning of the shell in the reverse direction carries the parts from the position of FIG. 2 to that of FIG. 1. Preferably two radially extending stop pins 110 are provided, as shown in FIG. 5, whereby the turning of arm 87 in either direction is limited.

The preferred illustrative embodiment of coupling shown is provided with means for positively locking ball half 46 in the position shown in FIG. 5 until the coupling parts 11 and 12 are correctly presented in mating relationship, and with means for positively locking the mating ball halves in the open position shown in FIG. 3. The first of such means is in the form of a reciprocable locking pin 97 disposed in a diametrically located bore in driving shaft or stem 77. Pin 97 has rounded outer ends and has a length equal to the diameter of stem 77. The pin has an enlarged head 99 of short axial extent, such head being slidably received within a counterbore 100 in stem 77. At a location within sleeve 22 aligned with the axis of stem 77 there is a bore receiving a reciprocable plunger 101 which has a diameter equal to that of the head 99 of pin 97. Plunger 101 is constantly urged toward the right (FIG. 3) by a coil compression spring 102 positioned in the rear end 104 of the plunger-receiving bore. The relationship of the parts is such that unless the portion 36 of the housing of coupling part 12 is in fully mated position within sleeve 22, plunger 101 will be pressed to the right to enter counterbore 100 and thus prevent the stem 77 from turning from its valve-closed position. When, however, housing part 36 is in the position of FIG. 4 it forces locking pin 97 to the left, thereby thrusting plunger 101 out of counterbore 100. When the locking pin and plunger have reached the position shown in FIG. 4 the ball halves are unlocked and may be turned to open position.

The second locking means takes the form of a leaf spring 105 having its inner end secured to the outer surface of sleeve 22 as by rivets 106. The body of the leaf spring extends generally peripherally of coupling part 11, terminating in the rounded, button-like end portion 107. A hole 109 is provided in sleeve 89 in such location as to receive the button 107 therethrough when the parts of the coupling occupy the positions shown in FIG. 3. Button 107 thus constitutes a positive lock which maintains sleeve 89 from rotation with respect to housing parts 22 and 36, and thus when so engaged in hole 109 prevents the parts from accidental turning out of the valve-open position shown.

The manner of use of the coupling of the invention will be apparent from the above. However, the operation of the coupling will be briefly reviewed. Before the coupling parts 11 and 12 are connected, they are placed in the relative positions shown in FIGS. 5 and 6. The swivel connection between parts 14 and 22 allows the internal portions of part 11 to be turned as by turning the sleeve 89 to bring the two coupling parts into alignment. The two coupling parts are now advanced toward each other so that the pins 43 on the housing part 22 enter holes 48 in the housing part 36 and the pins 64 on the ball half 46 enter holes 66 in the ball half 47. During this process of bringing the coupling parts together, the locking pin 97 is thrust back, thereby releasing plunger 101 from counterbore 100 in stem 77. After the coupling parts have been fully mated, the sleeve 89 may be turned counterclockwise from the position shown in FIG. 5, thereby to turn the mating ball parts 46, 47 from the closed position of FIG. 4 to the open position of FIG. 3. Immediately at the beginning of such turning, the crescent-shaped grooves in each of the ball halves begin to receive the entering edges of the crescent-shaped guide on the opposite coupling parts, so that the coupling parts and half ball members are effectively mechanically connected together before the passage 51 is opened. When the parts have reached the fully opened position of FIG. 3, the latch button 107 snaps outwardly through the hole 109, thereby preventing the coupling from being accidentally opened.

In FIG. 7 of the drawing there is fragmentarily shown an alternate embodiment of the so-called fixed end of the coupling corresponding to the end thereof designated 11 in the above-described embodiment. In such embodiment the body of such coupling end which corresponds generally to the part designated 36 in the first embodiment, is designated 117. Part 117 carries a ball half 47' which is similar to the ball half 47 in the first embodiment. Ball half 47' has crescent-shaped grooves in its upper and lower ends, such grooves receiving upper and lower crescent-shaped guides (not shown) carried by part 117 completely therewithin when the ball half 47' is swung to coupling-closed position, and being matingly connected to the crescent-shaped guides on the two coupling parts in the manner similar to that shown in FIG. 3 when the ball halves of the mating coupling parts are swung into coupling-open position. The other half of the coupling, which is designed to cooperate with the coupling half shown in FIG. 7, has the same construction as the coupling part designated 11 in FIG. 3.

The coupling half shown in FIG. 7 differs from that designated 12 in FIG. 3 by two main features. The means in the coupling half 117 effecting a seal between the housing and the ball halves is of such construction as to reduce the friction between it and the ball halves upon the turning of the latter, and is somewhat more effectively held in the housing. The second distinguishing feature of coupling half 117 is the provision of a locking means which positively locks the ball half 47' in passage-closing position when the coupling parts are separated.

In FIG. 7 the coupling part is provided with a short cylindrical sleeve member 67'' which generally corresponds to the right-hand end portion of element 67' (FIG. 3). Member 67'', which is provided with a flat annular end surface disposed at right angles to the axis of the coupling part, is constantly urged to the left by a plurality of springs similar to springs 71 which are disposed in spring-receiving bores spaced annularly about the axis of the coupling part. Interposed between the left-hand end of element 67' and the ball half or halves of the coupling is an annular sealing ring 115 which may be made of Teflon or similar material. Sealing member 115 has a radial thickness equal to that of element 67'', and presents a short inner cylindrical surface having a diameter equal to that of the passage through the coupling. Intermediate the length of its outer surface, member 115 is provided with a radially outwardly projecting flange which sealingly engages the inner surface of the coupling housing 117. Between the right-hand face of such flange and the end face of member 67'' there is disposed an O-ring 118 made of elastomeric material. A further, similar sealing ring 116 is disposed between the right-hand face of the flange and the bore of coupling housing 117. The left-hand face of sealing member 115 is disposed at such angle to the axis of the coupling part as generally to parallel the outer curved surface of the ball half or halves. Generally centrally of such angularly disposed surface of member 115 there is an annular generally V-shaped rib 114 which forcibly and sealingly engages the outer curved surface of the ball half or halves. As a result of such construction, sealing element 115 is firmly retained in position in the coupling housing at all times. The provision of the rib 114 minimizes friction between the ball half or halves and the sealing element 115 while insuring the maintenance of a complete seal therewith.

The coupling half shown in FIG. 7, as above explained, also incorporates a means for positively latching the ball half 47' and is positively locked in closed position when such ball half is turned to a position of 90° relative to that shown in FIG. 7 when the coupling parts are separated. Such locking means takes the form of a locking pin having an elongated cylindrical stem 113 which is reciprocable in a bore extending longitudinally of coupling housing 117. Stem 113 is constantly urged to the left by a coil compression spring 112 which is interposed between the inner end of the stem and the bottom of such bore. The left-hand end of the locking pin, below stem 113, is generally of reverse C-shape, having a radially extending portion lying somewhat inwardly or to the right of the outer end of stem 113 and an outwardly projecting cylindrical locking tang 111 at its lower end. Tang 111 is of such diameter and is so positioned as to be receivable within a hole 66 which extends completely through the marginal portion of the ball half 47'. Tang 111 is of such axial length and configuration as to be receivable within the crescent-shaped groove 61' in the ball half 47', as shown in FIG. 7. The main outer portion of part 110 of the locking pin lies radially outwardly of the upper crescent-shaped guide (not shown) carried by housing 117. Locking tang 111 is positioned in a central longitudinally extending slot in such upper crescent-shaped guide so as to form a portion of such guide when the locking pin is positioned as shown in FIG. 7. When, however, the ball half 47' is turned into its closed position, the locking pin is thrust to the left by spring 112 so that tang 111 enters hole 66 of ball half 47', thereby locking it from rotation. When the coupling halves are again to be connected, the tang 111 is retracted from hole 66 by the entry of the upper pin 64 on the ball half of the coupling part 11 into hole 66. The end of such pin 64 abuts the end of tang 111, thrusting the locking pin into the position shown in FIG. 7, and thus freeing the then-mated ball halves for rotation into coupling-open position.

Although only a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention as will now be apparent to those skilled in the art. As an example, the body of the coupling may, if desired, be appreciably shortened in length and lessened in weight by the omission of one or both of the enlarged wrench-receiving portions 16 and 40 of the housing parts and the placing of the joint-providing portions 17 and 41 immediately adjacent the portions 14 and 35 of the coupling parts. The coupling may be used to conduct liquids and gases, and, when appropriate materials are employed for its various fluid contacting elements, may be used successfully with a large number of corrosive media.

What is claimed is:

1. A detachable coupling adapted for the flow of fluid therethrough, comprising an elongated housing formed of a pair of complementary housing parts having ports therein for fluid flow therethrough, a first one of said housing parts having an elongated hollow body and the second one of said housing parts having a hollow body with an end portion adapted to be sealed to the outer end of the body of the first housing part, the two interfitting housing parts forming at all times a fluid-tight conduit between the ports of the coupling, a two-piece valve element, the two pieces of the valve element fitting together to form a single body of revolution, said valve element being mounted in both of the housing parts for rotation about its axis generally at right angles to the longitudinal axis of the housing, the valve element having a central fluid conducting passage therethrough which is aligned with the ports when the valve element is turned into its open position, and means selectively detachably connecting the housing parts and retaining a piece of the valve element in each housing part for sealing the ports when the housing parts are disconnected, said last named means comprising guide means on the valve element and guiding means within the conduit formed by the interfitting housing parts selectively interlocking with the guide means, the guide means and guiding means lying in planes parallel to the longitudinal axis of the housing.

2. A detachable coupling as claimed in claim 1, wherein the end portion of said second one of the housing parts is adapted to be received within the outer end of the body of the first housing part.

3. A detachable coupling as claimed in claim 1, comprising means for rotating the valve element between open and closed positions, said last named means comprising a shaft journalled in and sealed to the wall of the end portion of one of the housing parts, the valve element being divided into said two parts along a diametral plane containing the axis of said shaft, and means detachably connecting the inner end of the shaft to each of the parts of the valve element.

4. A detachable coupling as claimed in claim 3, wherein said shaft extends through and is journalled in the end portion of the elongated hollow body of the first housing part.

5. A detachable coupling as claimed in claim 3, comprising cooperating means on the shaft and the other of said parts of the housing selectively to lock the shaft in valve element closed position when the housing parts are separated.

6. A detachable coupling as claimed in claim 5, comprising cooperating means on the said one part of the housing and on the other part of the housing selectively to lock the part of the valve element in the other part of the housing in closed position when the housing parts are separated, and means to unlock the shaft and the part of the valve element in said other part of the housing when the housing parts are disposed in fully mated position.

7. A detachable coupling as claimed in claim 5, wherein the means for locking the shaft comprises a first plunger in the said one housing part which journals the shaft, said first plunger being reciprocable toward and away from the shaft, a transverse bore in the shaft adapted to receive the forward end of the first plunger whereby to lock the shaft, means resiliently urging the first plunger into the bore in the shaft, a second plunger in the bore in the shaft, the forward end of the second plunger being moved rearwardly by engagement with the other housing part when the housing parts are matingly engaged, whereby to unlock the shaft.

8. A detachable coupling as claimed in claim 2, comprising an outer sleeve coaxial of the housing rotatably mounted on one of the housing parts, and driving means connecting the sleeve and the shaft whereby turning of the sleeve rotates the valve element.

9. A detachable coupling as claimed in claim 8, wherein the driving means connecting the sleeve and the shaft comprises a radial arm affixed to the shaft, an elongated slot in the arm, and a stud affixed to the sleeve and projecting into the slot, whereby turning of the sleeve rotates the shaft and valve element.

10. A detachable coupling as claimed in claim 8, comprising a releasable lock means for retaining the sleeve in valve element open position.

11. A detachable coupling as claimed in claim 10, wherein the releasable lock means for retaining the sleeve in valve element open position comprises an outwardly resiliently pressed detent mounted on the first one of the coupling parts, and an opening in the sleeve into which the detent snaps when the sleeve is in valve element open position.

12. A detachable coupling adapted for the flow of fluid therethrough, comprising a pair of complementary housing parts having ports therein for fluid therethrough, a first one of said housing parts having an elongated hollow body and the second one of said housing parts having a hollow body with an end portion adapted to be sealed to the outer end of the body of the first housing part, a two-piece valve element in the form of a body of revolution having a central passage therethrough, said valve element being mounted for rotation about its axis in both of the housing parts, means selectively detachably connecting the housing parts and retaining a piece of the valve element in each housing part for sealing the ports when the housing parts are disconnected, means for rotating the valve element between open and closed positions, releasable means to lock the valve element in open position when the housing parts are in mating interfitting relationship, and releasable means to lock the pieces of the valve element in closed position when the housing parts are separated, said last named means comprising a separable locking means on each housing part for locking the respective piece of the valve element in closed position when the housing parts are separated, and means on each of the housing parts operable when the housing parts are placed in mating interfitting relationship to engage and thereby to release the said locking means on the opposite housing part.

13. A detachable coupling adapted for the flow of fluid therethrough, said coupling having a housing comprising two generally cylindrical housing parts having ports therein for fluid flow therethrough and having end portions adapted to fit together in telescopic sealed relationship to form said housing, the two housing parts when matingly interfitting forming at all times a fluid-tight conduit between the ports of the coupling, a two-part valve element in the housing, said element being in the form of a body of revolution and having a central fluid conducting passage therethrough, the valve element being adapted to be turned from a first position wherein the passage therein directly communicates with the ports in the housing to a second position in which it lies across such ports, the valve element being divided into two generally similar parts substantially along a diametral plane containing the axis of said passage, and means selectively detachably connecting the housing parts and retaining a part of the valve element in a respective housing part to seal the ports when the housing parts are disconnected, said last named means comprising guides disposed on parts of circles in each of the confronting end portions of the housing parts, said guides being disposed in a plane parallel to the axis of the passage through the valve element, guiding means disposed on parts of circles on each of the halves of the valve element disposed in a plane parallel to the axis of the passage through the valve element and adapted to interfit with the guides on the end portions of the housing parts, the guides and guiding means being located within said conduit, the guide means on the valve element parts interfitting wholly with the guides on their respective housing parts when the valve element is disposed in its second position, the guide means on both of the valve element parts mating for substantially one-half of their extents with the guides on both of the housing parts when the valve element is in its first position.

References Cited by the Examiner

UNITED STATES PATENTS

| 2,326,143 | 8/43 | Hufferd. |
| 2,357,232 | 8/44 | Snyder et al. |
| 2,509,444 | 5/50 | Mitchell. |
| 2,712,454 | 7/55 | Love. |
| 2,948,553 | 8/60 | Gill et al. |
| 2,991,090 | 7/61 | De Cenzo. |

FOREIGN PATENTS

| 874,879 | 5/42 | France. |

LAVERNE D. GEIGER, *Primary Examiner.*

MORRIS M. FRITZ, M. CARY NELSON, *Examiners.*